United States Patent
Akiyama

(10) Patent No.: US 6,633,431 B2
(45) Date of Patent: Oct. 14, 2003

(54) OPTICAL SYSTEM AND OPTICAL APPARATUS HAVING THE SAME

(75) Inventor: Takeshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 09/734,726

(22) Filed: Dec. 13, 2000

(65) Prior Publication Data

US 2001/0017732 A1 Aug. 30, 2001

(30) Foreign Application Priority Data

Dec. 15, 1999  (JP) ............................ 11-356273

(51) Int. Cl.[7] ................ G02B 17/00; G02B 23/00; G02B 15/14; G02B 5/04
(52) U.S. Cl. ................ 359/364; 359/365; 359/431; 359/432; 359/433; 359/678; 359/716; 359/720; 359/726; 359/737; 359/739; 359/834; 359/837
(58) Field of Search .................... 359/364–366, 359/431–433, 633, 676, 678, 682, 684, 685, 689, 708, 716, 720, 726–731, 737, 739, 834, 837

(56) References Cited

U.S. PATENT DOCUMENTS

| 4,812,030 A | 3/1989 | Pinson | 359/366 |
|---|---|---|---|
| 4,993,818 A | 2/1991 | Cook | 359/859 |
| 5,063,586 A | * 11/1991 | Jewell et al. | 359/859 |
| 5,999,311 A | 12/1999 | Nanba et al. | 359/365 |
| 6,021,004 A | 2/2000 | Sekita et al. | 359/676 |
| 6,120,156 A | 9/2000 | Akiyama | 359/857 |
| 6,124,986 A | 9/2000 | Sekita et al. | 359/691 |
| 6,163,400 A | 12/2000 | Nanba | 359/365 |
| 6,166,866 A | 12/2000 | Kimura et al. | 359/729 |
| 6,270,224 B1 | 8/2001 | Sunaga et al. | 359/857 |
| 6,292,309 B1 | 9/2001 | Sekita et al. | 359/729 |
| 6,313,942 B1 | 11/2001 | Nanba et al. | 359/365 |

FOREIGN PATENT DOCUMENTS

| JP | 9-258105 | 10/1997 |
|---|---|---|
| JP | 9-258106 | 10/1997 |

* cited by examiner

*Primary Examiner*—Evelyn Lester
(74) *Attorney, Agent, or Firm*—Fitzpatrick, Cella, Harper & Scinto

(57) ABSTRACT

An optical system comprises, in succession from the object side, a first optical element of negative optical power, a second optical element of positive optical power, and a third optical element of negative optical power, at least one of the first to third optical elements being a refracting optical element having a reflecting curved surface.

12 Claims, 7 Drawing Sheets

OPTICAL SYSTEM AND OPTICAL APPARATUS HAVING THE SAME

BACKGROUND OF THE INVENTION

1. Field of the Invention

This invention relates to an optical system, and particularly to an optical system having a reflecting optical element for forming the image of an object on the surface of a predetermined plane in a video camera, a still video camera, a copier or the like.

2. Related Background Art

Heretofore, optical systems comprised of refracting lenses alone are known as zoom optical systems, and these are generally such that refracting lenses provided with rotation-symmetrical spherical surfaces or rotation-symmetrical aspherical surfaces with respect to an optical axis are successively disposed in the direction of the optical axis and magnification change is effected by changing the spacing therebetween.

On the other hand, there is also known the zooming technique of moving a plurality of reflecting surfaces relative to one another to thereby vary the imaging magnification or focal length of a photo-taking optical system.

As shown in FIG. 6 of the accompanying drawings, in a cassegrainian reflector disclosed, for example, in U.S. Pat. No. 4,812,030, the spacing from a concave mirror 101 to a convex mirror 102 and the spacing from the convex mirror 102 to an imaging plane 103 are changed relative to each other to thereby effect magnification change.

FIG. 7 of the accompanying drawings shows another example disclosed in U.S. Pat. No. 4,812,030. An object beam 138 from an object impinges on a first concave mirror 131 and is reflected by the surface thereof and becomes a convergent beam and travels toward the object side and impinges on a first convex mirror 132, and is reflected toward the imaging plane side thereby and becomes a substantially parallel beam and impinges on a second convex mirror 134, and is reflected by the surface thereof and becomes a divergent beam and impinges on a second concave mirror 135, and is reflected thereby and becomes a convergent beam and is imaged on an imaging plane 137. The spacing between the first concave mirror 131 and the first convex mirror 132 is changed and also the spacing between the second convex mirror 134 and the second concave mirror 135 is changed to thereby change the focal length of an entire mirror optical system.

Also, in U.S. Pat. No. 4,993,818, the image formed by the Cassegrainian reflector shown in FIG. 6 is secondary-imaged by another mirror optical system provided at a rear stage, and the imaging magnification of this mirror optical system for secondary imaging is changed to thereby effect the magnification change of the entire optical system.

These optical system of the reflection type have required a great number of constituent parts, and to obtain necessary optical performance, it has been necessary to accurately assemble the respective optical parts. Particularly, the accuracy of the relative positions of the reflecting mirrors is severe and therefore, the adjustment of the position and angle of each reflecting mirror has been necessary.

As a method of solving this problem, there has been proposed, for example, a method of making mirror systems into a block to thereby avoid the incorporation errors of the optical parts occurring during the assembly thereof.

FIG. 8 of the accompanying drawings shows an embodiment of the reflecting optical system disclosed in Japanese Patent Application Laid-Open No. 09-258106 (corresponding to U.S. Pat. No. 5,999,311). A beam from an object passes through lenses (R1–R2) which are a first optical element B1 and a stop R3, and thereafter enters a second optical element B2. In the second optical element B2, the beam is refracted by a fourth surface R4, is reflected by a fifth surface R5, a sixth surface R6, a seventh surface R7 and an eighth surface R8, is refracted by a ninth surface R9, and emerges from the second optical element B2. At this time, the beam is primary-imaged on an intermediate imaging plane near the sixth surface.

Next, the beam enters a third optical element B3. In the third optical element B3, the beam is refracted by a tenth surface R10, is reflected by an eleventh surface R11, a twelfth surface R12, a thirteenth surface R13 and a fourteenth surface R14, is refracted by a fifteenth surface R15, and emerges from the third optical element B3.

Next, the beam enters a fourth optical element B4. In the fourth optical element B4, the beam is refracted by a sixteenth surface R16, is reflected by a seventeenth surface R17, an eighteenth surface R18, a nineteenth surface R19, a twentieth surface R20 and a twenty-first surface R21, is refracted by a twenty-second surface R22, and emerges from the fourth optical element B4. The beam having emerged from the fourth optical element B4 is finally imaged on an imaging plane R28, i.e., the photographing surface of an image pickup medium such as a CCD.

The movement of each optical element resulting from the magnification changing operation will now be described. In case of magnification change, the first optical element B1 which is a first optical unit, the stop R3, the third optical element B3 which is a third optical unit and a block B5 are fixed and are not moved. The second optical element B2 which is a second optical unit is moved in Z plus direction from the wide angle end toward the telephoto end in parallelism to the incidence reference axis of this optical element. Also, the fourth optical element B4 which is a fourth optical unit is moved in Z plus direction from the wide angle end toward the telephoto end in parallelism to the incidence reference axis of this optical element. A filter, cover glass and the twenty-eighth surface R28 which is the final imaging plane are not moved in case of focal length change.

The spacing between the second optical element B2 and the third optical element B3 is narrowed by the magnification change from the wide angle end toward the telephoto end, the spacing between the third optical element B3 and the fourth optical element B4 is widened, and the spacing between the fourth optical element B4 and the twenty-third surface R23 is widened.

That is, use is made of a plurality of optical elements comprising reflecting surfaces which are a plurality of curved surfaces and flat surfaces formed integrally with one another, and the relative position of at least two of the plurality of optical elements is appropriately changed to effect zooming, whereby the downsizing of the entire mirror optical system is achieved and yet the disposition accuracy (assembly accuracy) of the reflecting mirrors incidental to the mirror optical system is loosened.

Also, by adopting a construction in which the stop is disposed most adjacent to the object side of the optical system and the object image is formed at least once in the optical system, a reduction in the effective diameter of the optical system is achieved in spite of being a reflection type zoom optical system of a wide angle of view, and appropriate refractive power is given to a plurality of reflecting surfaces constituting the optical elements and the reflecting surfaces constituting each optical element are eccentrically disposed, whereby the optical path in the optical system is bent into a desired shape to thereby achieve the shortening of the full length of the optical system in a predetermined direction.

However, in the prior-art optical system comprising refracting optical elements alone, it is often the case that the entrance pupil is deep at the back of the optical system, and this leads to the problem that the greater is the spacing to the incidence surface located most adjacent to the object side as viewed from the stop, the larger becomes the effective diameter of the beam on the incidence surface with the enlargement of the angle of view.

Also, in both of the optical systems having the magnification changing function disclosed in the above mentioned U.S. Pat. No. 4,812,030 and the above-mentioned U.S. Pat. No. 4,993,818, the number of constituent parts such as reflecting mirrors and an imaging lens is great, and to obtain necessary optical performance, it is necessary to accurately assemble the respective optical parts. Particularly, the accuracy of the relative positions of the reflecting mirrors becomes severe and therefore, it is necessary to effect the adjustment of the position and angle of each reflecting mirror.

Also, in the optical system proposed in the above-mentioned Japanese Patent Application Laid-Open No. 09-258106, the downsizing of the entire mirror optical system is achieved and yet the disposition accuracy, i.e., assembly accuracy, of the reflecting mirrors incidental to the mirror optical system is loosened, but there is only a single lens on the object side of the stop and it is immovable and therefore, to make the F number constant during zooming, the diameter of the stop must be varied. If the F number is determined, the diameter of the stop is determined and therefore, when the size of image is small as in a still video camera, the diameter of a small stop necessarily becomes small. There also arises the problem that due to the cosine fourth power rule, the quantity of marginal light is greatly reduced. Also, all of the four elements constituting the optical system have negative optical power (optical power is the same meaning of the reciprocal number of the focal length), and this is not preferable in the correction of aberrations. Further, almost all of the surfaces constituting the third optical element which is a magnification changing portion have relatively strong positive power alone, and this is not preferable in the correction of aberrations.

SUMMARY OF THE INVENTION

The present invention has as its object to make, in an optical system having a reflecting optical element, the power arrangement of respective optical units appropriate to thereby make optical performance good.

In order to achieve the above object, an optical system according to an embodiment of the present invention is provided, in succession from the object side, with a first optical element of negative optical power, a second optical element of positive optical power and a third optical element of negative optical power, and is characterized in that at least one of the first to third optical elements is a reflecting optical element having a reflecting curved surface.

Also, an optical system according to another embodiment of the present invention is provided, in succession from the object side, with a first optical unit of negative optical power, a second optical unit of positive optical power and a third optical unit of negative optical power, and is characterized in that the positions of at least two of the first to third optical units relative to the imaging plane are changed to thereby effect zooming, and at least one of the first to third optical units has a reflecting optical element having a reflecting curved surface.

DESCRIPTION OF THE PREFERRED EMBODIMENTS

Prior to the description of embodiments, description will be made of a coordinate system necessary to handle an off-axial optical system adopted in the present embodiment. The off-axial optical system refers to such an optical system that a plane normal at a point intersecting with a reference axis which will be described later contains a curved surface which does not coincide with the reference axis.

Figure 1:
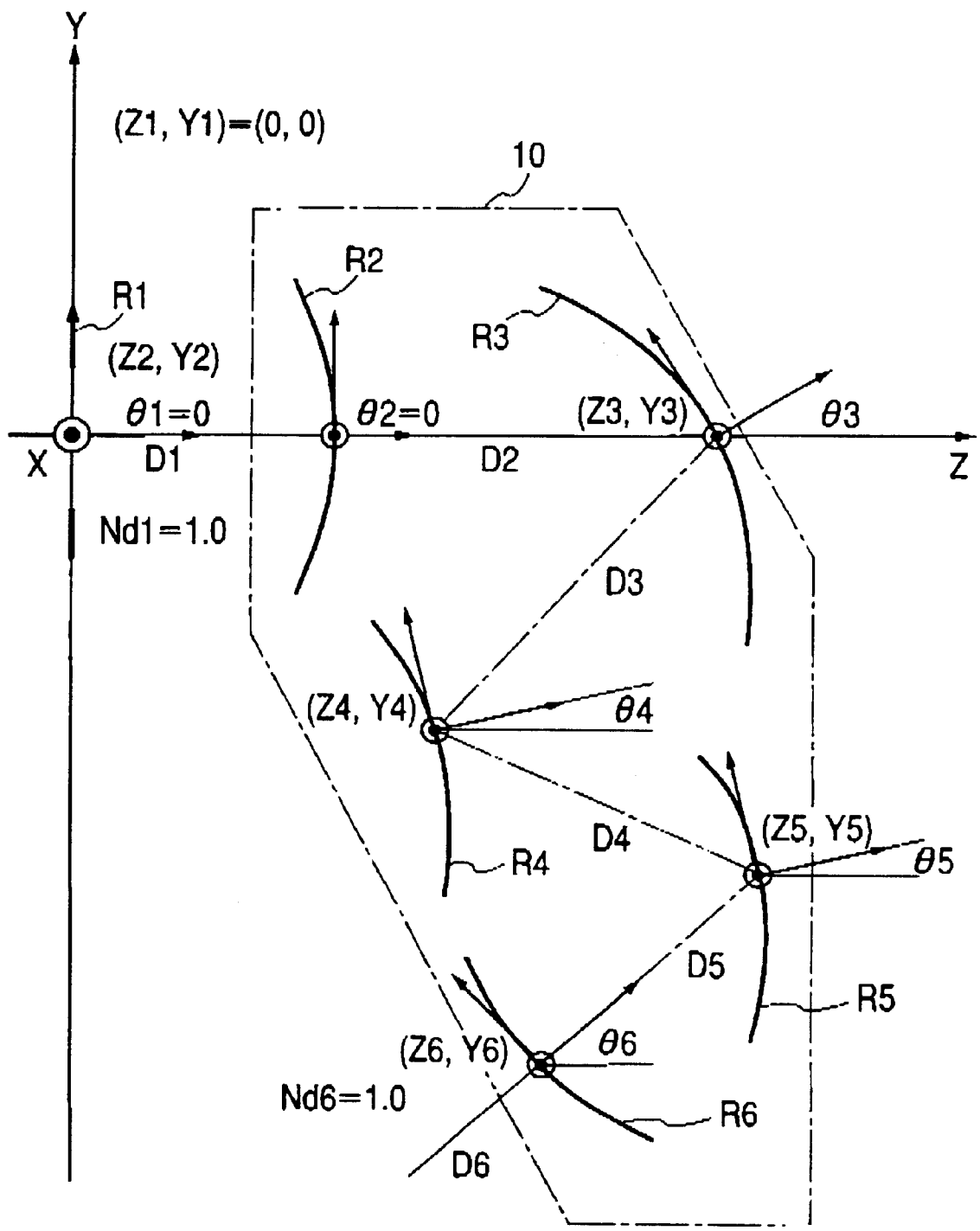
FIG. 1 is an illustration of the coordinate system of an off-axial optical system.

FIG. 1 is an illustration of a coordinate system defining the construction data of an optical system according to the present embodiment. The i-th surface along a ray of light travelling from an object, not shown, to the imaging plane, i.e., a reference axis ray of light indicated by dot-and-dash line in FIG. 1, is defined as the i-th surface.

In FIG. 1, a first surface R1 is a stop, a second surface R2 is a refracting surface, a third surface R3 is a reflecting surface tilted with respect to the second surface R2, a fourth surface R4 and a fifth surface R5 are reflected surfaces shifted and tilted with respect to their preceding surfaces, and a sixth surface R6 is a refracting surface shifted and tilted with respect to the fifth surface R5. Each of the second surface R2 to the sixth surface R6 is constructed on an optical element formed of a medium such as glass or plastic, and in FIG. 1, the optical element is designated by 10.

Accordingly, the medium from an object surface, not shown, to the second surface R2 is air, the medium from the second surface R2 to the sixth surface R6 is a certain common medium, and the medium from the sixth surface R6 to the imaging plane, not shown, is air.

Since the optical system according to the present embodiment is an off-axial optical system, the surfaces constituting the optical system have no common optical axis. So, in the present embodiment, an absolute coordinate system having the center of the first surface as the origin is first set. Also, the path of a ray of light (reference axis ray of light) passing through the origin and the center of the final imaging plane is defined as the reference axis of the optical system. Further, the reference axis in the present embodiment has a direction. The positive direction thereof is a direction in which the reference axis ray of light travels in case of imaging. However, as the axis which becomes the reference of the optical system, there can be adopted an axis convenient in optical design, in putting aberrations in order or in expressing the form of each surface constituting the optical system. Generally, however, the path of a ray of light passing through the center of the imaging plane, and the stop or the entrance pupil or the exit pupil or the center of the first surface of the optical system or the center of the last surface is set as the reference axis which is the reference of the optical system.

That is, the path along which the ray of light (reference axis ray of light) passing through the central point of the first surface to the center of the final imaging plane is refracted and reflected by each refracting surface and each reflecting surface is set as the reference axis. The order of the surfaces is set to the order in which the reference axis ray of light is subjected to refraction and reflection.

Accordingly, the reference axis finally arrives at the center of the imaging plane while having its direction changed along the set order of the surfaces in accordance with the law of refraction or reflection.

The tilted surfaces constituting the optical system according to the present embodiment are basically all tilted in the same plane.

So, each axis of the absolute coordinate system (X, Y, Z) is defined as follows. The Z-axis is a straight line passing through the origin and the center of the object surface, and the direction from the object surface toward the first surface R1 is defined as positive. Also, the Y-axis is a straight line passing through the origin and counter-clockwise forming 90° with respect to the Z-axis in the tilted plane, i.e., in the plane of the drawing sheet of FIG. 1. Also, the X-axis is a straight line passing through the origin and perpendicular to the Z-axis and the Y-axis, i.e., perpendicular to the plane of the drawing sheet of FIG. 1.

Also, to represent the form of the i-th surface constituting the optical system, it is easier in recognizing the form to set a local coordinate system having the point at which the reference axis and the i-th surface intersect with each other as the origin and represent the plane form of that plane by the local coordinate system than to represent the form of that plane by the absolute coordinate system and therefore, the surface form of the i-th surface is represented by the local coordinate system.

Also, the angle of tilt of the i-th surface in the YZ plane is represented by an angle $\theta i$ (unit °) in which the counter-clockwise direction is positive with respect to the Z-axis of the absolute coordinate system. Consequently, in the present embodiment, the origin of the local coordinates of each surface is on the YZ plane. Also, there is no eccentricity of the plane in the XZ and XY planes.

Further, the y-axis and z-axis of the local coordinates (x, y, z) of the i-th surface are inclined by an angle $\theta i$ in the YZ plane with respect to the absolute coordinate system (X, Y, Z), and specifically are set as follows.

That is, the z-axis is a straight line passing through the origin of the local coordinates and counter-clockwise forming an angle $\theta i$ in the plane of the drawing sheet in the YZ plane with respect to the Z-direction of the absolute coordinate system, the y-axis is a straight line passing through the origin of the local coordinates and counter-clockwisely forming 90° in the YZ plane with respect to the z-direction, and the x-axis is a straight line passing through the origin of the local coordinates and perpendicular to the YZ plane.

Also, Di is a scalar amount representative of the spacing between the i-th surface and the origin of the local coordinates of the (i+1)th surface, and Ndi and vdi are the refractive index and Abbe number, respectively, of the medium between the i-th surface and the (i+1)th surface.

Also, in the optical system according to the present embodiment, the focal length of the whole is changed by the movement of a plurality of optical elements to thereby effect focal length change.

In the present embodiment, the cross-sectional views and numerical value data of the optical system at three positions, i.e., the wide angle end (W), the telephoto end (T) and the middle position (M) therebetween are shown.

It is the origins (Yi, Zi) of the local coordinates representative of the positions of respective planes that changes in value at each magnification change position when the optical elements are moved in the YZ plane, but in the present embodiment, the optical element moved for focal length change is moved only in the Z-direction and therefore, the coordinate value Zi is represented by Zi(W), Zi(M) and Zi(T) in the order in which the optical system is in the states of the wide angle end, the middle and the telephoto end. The value at the wide angle end is shown as the coordinate value of each surface, and at the middle and the telephoto end, the differences thereof from the wide angle end will be described Specifically, if the amounts of movement at the middle position (M) and the telephoto end (T) relative to the wide angle end (W) are defined as a and b, respectively, they are represented by the following expressions:

$$Zi(M) = Zi(W) + a$$

$$Zi(T) = Zi(W) + b$$

The sign of a and b is positive when each plane is moved in Z plus direction, and is negative when each plane is moved in Z minus direction.

In the optical system according to the present embodiment, each optical acting surface is a spherical surface or a rotation-asymmetrical aspherical surface. The spherical portion thereof has its radius of curvature Ri written as a spherical shape. The sign of the radius of curvature Ri is minus when the center of curvature is on the object side along the reference axis travelling from the first plane to the imaging plane, i.e., the dot-and-dash line in FIG. 1, and is plus when the center of curvature is on the image side.

The following is a mathematical expression representative of the spherical surface.

$$z = \frac{(x^2 + y^2)/Ri}{1 + \{1 - (x^2 + y^2)/Ri^2\}^{1/2}}$$

The following is a mathematical expression representative of a rotation-asymmetrical aspherical surface. This numerical expression includes only odd order terms with respect to X and thus, is representative of a plane-symmetrical shape having the yz plane as the plane of symmetry.

$$z = C02y^2 + C20x^2 + C03y^3 + C21x^2y + C04y^4 + C22x^2y^2 + C40X^4 + C05y^5 + C23x^2y^3 + C41x^4y + C06y^6 + C24x^2y^4 + C42x^4y^2 + C60x^6$$

Further when the following two conditional expressions are satisfied, a shape symmetrical with respect also to the xz plane is represented.

$$C03 = C21 = 0$$

$$C05 = C23 = C41 = 0$$

Further, when the following three conditional expressions are satisfied, a rotation-symmetrical shape is represented.

$$C02 = C20$$

$$C04 = C40 = C22/2$$

$$C06 = C60 = C24/3 = C42/3$$

When the foregoing conditions are not satisfied, it is a non-rotation-symmetrical shape.

Description will now be made of the calculation of the paraxial amount of the power or the like of each element.

In an off-axial system, as in a coaxial system, the expression of imaging is $$(N'A)/s' - (ND)/s - \Phi = 0,$$

where A and D are the diagonal components of a Gaussian bracket which is a two-column two-row matrix in the expression as follows, and $\Phi$ is the power when $B=0$ and $AD=1$.

The following expression is a mathematical expression for finding the image height by the Gaussian bracket.

$$\begin{bmatrix} h' \\ \alpha' \end{bmatrix} = \begin{bmatrix} A & 0 \\ \Phi & D \end{bmatrix} \begin{bmatrix} h \\ \alpha \end{bmatrix}$$

A, D and $\Phi$ are specifically represented as follows:

$$A = \sqrt{\frac{\cos\theta'(\cos\theta'\cos\xi'\cos\xi + \cos\theta\sin\xi'\sin\xi)}{\cos\theta(\cos\theta'\sin\xi'\sin\xi + \cos\theta\cos\xi'\cos\xi)}}$$

$$D = 1/A = \sqrt{\frac{\cos\theta(\cos\theta'\sin\xi'\sin\xi + \cos\theta\cos\xi'\cos\xi)}{\cos\theta'(\cos\theta'\cos\xi'\cos\xi + \cos\theta\sin\xi'\sin\xi)}}$$

$$\Phi = \frac{2(N'\cos\theta' - N\cos\theta)\{\cos\xi'\cos\xi C20 + (\cos\theta'\sin\xi'\cos\xi + \cos\theta\cos\xi'\sin\xi)C11 + \cos\theta\cos\theta'\sin\xi'\sin\xi C02\}}{\sqrt{\cos\theta\cos\theta'(\cos\theta'\cos\xi'\cos\xi + \cos\theta\sin\xi'\sin\xi)(\cos\theta'\sin\xi'\sin\xi + \cos\theta\cos\xi'\cos\xi)}}$$

The paraxial trace of the entire off-axial system is effected by the use of the following expression of refraction and expression of transfer.

(expression of refraction)

$$hi' = Ai \cdot hi$$

$$\alpha i' = \Phi i \cdot hi + Di \cdot \alpha i$$

(expression of transfer)

$$hi+1 = hi' - ei' \cdot \alpha i'$$

$$\alpha i+1 = \alpha i'$$

However, the differences from the coaxial system are that in the expression of refraction, Ai and Di are generally not 1 and that Ai, Di and $\Phi$i depend on azimuth.

The flow of paraxial trace calculation for a given azimuth $\xi$ is shown below.

At the first step, the initial values h1 and $\alpha$1 of paraxial trace are set for the given data of the optical system such s1. Here, $\alpha$1 is $(N1 \cdot h1)/(s1)$.

At the second step, the paraxial amounts Ai, $\phi$i and Di on the refracting surface are found.

At the third step, hi' and $\alpha$i' are found by the use of the expression of refraction.

At the fourth step, when the surface number i is not the number of the last surface, hi+1 and $\alpha$1 +1 are found by the use of the expression of transfer.

At the fifth step, the first to fourth steps are repeated until the surface number i becomes the last number k.

At the sixth step, the components A, B, $\Phi$ and D of the Gaussian bracket are found so that the values of hk' and $\alpha$k' at the surface number k found by the foregoing calculation may always satisfy $$hk' = A \cdot h1 + B \cdot \alpha 1$$

and $$\alpha k' = \Phi \cdot h1 + D \cdot \alpha 1.$$

At the seventh step, by the use of A, B, $\Phi$ and D found by the above calculation, the focal length f, the principal points H, H' and the back focal length sk' are found by the following expressions as in the coaxial system.

$$f = 1/\Phi$$

$$H = N1\Delta 1 \quad \Delta 1 = (1-D)/\Phi$$

$$H' = Nk'\Delta k' \quad \Delta k' = (A-1)/\Phi$$

$$sk' = Nk'(f + \Delta k')$$

By these expressions, the focal length, the principal points and the back focal length of the reflecting optical system according to the present embodiment can be found.

The embodiment of the present invention will hereinafter be specifically described with reference to the drawings.

Figure 2A:
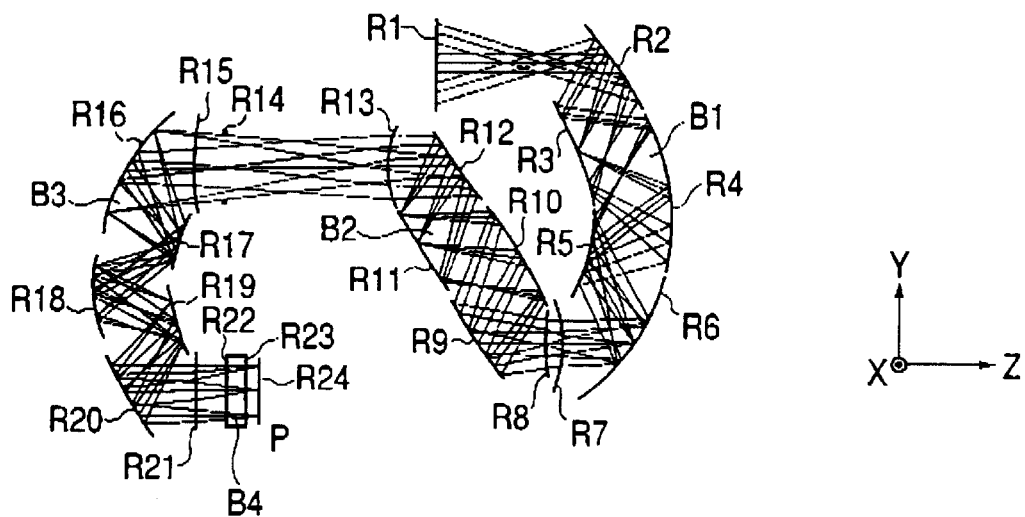
FIGS. 2A, 2B and 2C are cross-sectional views of a reflecting optical system according to the present embodiment.
Figure 2B:
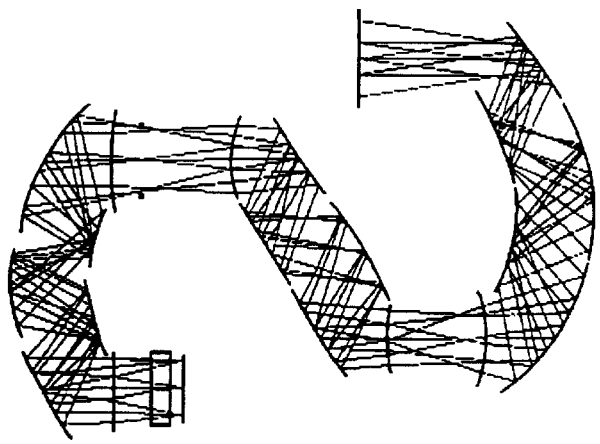
Figure 2C:
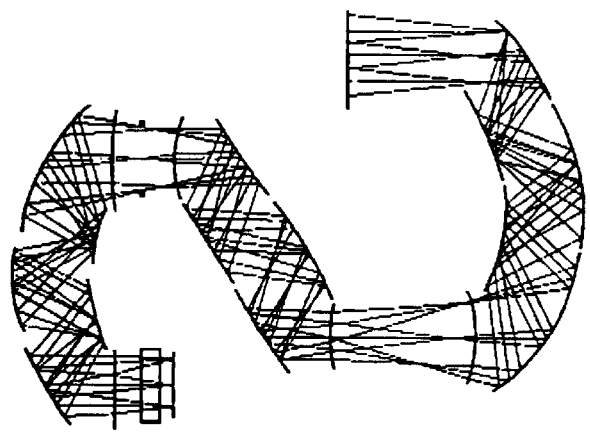

FIGS. 2A to 2C are optical cross-sectional views of the optical system having a reflecting optical element (hereinafter referred to also as the reflecting optical system) according to the present embodiment in the YZ plane, FIG. 2A showing the wide angle end, FIG. 2B showing the middle position, and FIG. 2C showing the telephoto end. In the present embodiment, the image pickup optical system of a zoom lens comprised of three optical units having a variable power ratio of about three times will be described as an example. In FIG. 2A, a first surface R1 to a seventh surface R7 are optical acting surfaces constituting a first optical element B1, an eighth surface R8 to a thirteenth surface R13 are optical acting surfaces constituting a second optical element B2, and a fifteenth surface R15 to a twenty-first surface R21 are optical acting surfaces constituting a third optical element B3, and they integrally constitute the respective optical elements. A fourteenth surface R14 is a stop, and B4 is an optical correction plate comprising a plane parallel plate which is comprised of a low-pass filter, an infrared cut filter or the like formed of rock crystal. P is the surface of an image pickup element which is the final imaging plane, and is, for example, the image pickup surface of a CCD (image pickup medium).

Description will hereinafter be made of the imaging action when the object position is infinity. A beam from the object first enters the first optical element B1.

In the first optical element B3, the beam is refracted by the first surface R1, is reflected by the second surface R2, the third surface R3, the fourth surface R4, the fifth surface R5 and the sixth surface R6, is refracted by the seventh surface R7, and emerges from the first optical element B1. An entrance pupil is formed between the first surface R1 and the second surface R2. Further, a pupil is formed near the sixth surface R6. Also, intermediate imaging takes place between the third surface R3 and the fourth surface R4.

Next, the beam enters the second optical element B2. In the second optical element B2, the beam is refracted by the eighth surface R8, is reflected by the ninth surface R9, the tenth surface R10, the eleventh surface R11 and the twelfth surface R12, is refracted by the thirteenth surface R13, and emerges from the second optical element B2.

Here, the beam has an intermediate image near the eleventh surface R11.

Next, the beam having emerged from the second optical element B2 passes through the fourteenth surface R14 which is a stop, and enters the third optical element B3. In the third optical element B3, the beam is refracted by the fifteenth surface R15, is reflected by the sixteenth surface R16, the seventeenth surface R17, the eighteenth surface R18, the nineteenth surface R19 and the twentieth surface R20, is refracted by the twenty-first surface R21, and emerges from the third optical element B3. Here, the beam forms a pupil near the nineteenth surface R19. Further, the beam is intermediately imaged near the seventeenth surface R17.

Lastly, the beam having emerged from the third optical element B3 passes through the optical is correction plate B4, and is imaged on P which is the final imaging plane.

The second optical element B2 is such that the incidence reference axis and emergence reference axis thereof are parallel to each other and their directions are the same direction. Also, the third optical element B3 is such that the directions of the incidence reference axis and emergence reference axis thereof differ by 180° from each other.

Description will now be made of the movement of each optical element resulting from the magnification changing operation. The second optical element B2 is moved in Z minus direction to thereby effect the magnification change from the wide angle end to the telephoto end, and the fluctuation of the imaging plane resulting from the focal length change is corrected by the third optical element B3 being moved. In case of the magnification change, the first optical element B1 is stationary. Focusing is effected by the third optical element B3 being moved. P which is the imaging plane is not moved in case of the magnification change. The first optical element B1 corresponds to the so-called fore lens of a variable power optical system, the second optical element B2 corresponds to a so-called variator, and the third optical element B3 corresponds to a compensator.

In FIGS. 2A to 2C, the beam from the object looks like it is being eclipsed by the second optical element B2, but actually a plane mirror can be interposed to make the incidence optical axis perpendicular to the plane of the drawing sheet of FIGS. 2A to 2C. The plane mirror portion may be molded integrally with the first optical element B1, or a discrete part may be cemented to the first optical element.

The specification of the reflecting optical system according to the present embodiment will be shown below. A horizontal half angle of field uY is a half value of the maximum angle of field of a beam entering the first surface R1 in the YZ plane, and a vertical half angle of field uX is a half value of the maximum angle of field of a beam entering the first surface R1 in the XZ plane. Also, the diameter of the entrance pupil is shown as the entrance pupil diameter. This relates to the brightness of the optical system. Also, the effective image range on the imaging plane is shown as the image size. The image size is represented by a rectangular area in which the size in the y-direction of the local coordinates is horizontal and the size in the x-direction of the local coordinates is vertical.

|  | Wide side end | Middle | Tele side end |
| --- | --- | --- | --- |
| Horizontal field angle vY | 26.3 | 13.8 | 9.3 |
| Vertical field angle vX | 20.4 | 10.5 | 7.0 |
| Entrance pupil diameter | 1.30 | 2.60 | 3.90 |
| Image size |  | 3.6 × 2.7 |  |

The following is a table showing the focal lengths of the three optical elements constituting the reflecting optical system of the present invention obtained by the aforedescribed definition.

|  | Focal length |
| --- | --- |
| First optical unit | −9.86 |
| Second optical unit | +8.01 |
| Third optical unit | −10.11 |

Next, the data of some numerical value embodiments of the optical system according to the present embodiment will be shown below. The meanings of the symbols in the numerical value embodiment follow the definition described with reference to FIG. 1. In the numerical value embodiments, for example, "2.64297e−02" means "2.64297×10$^{-02}$".

| i | Yi | Zi(W) | φi | Di | Ndi | vdi |  |
| --- | --- | --- | --- | --- | --- | --- | --- |
| 1 | 0.00 | 0.00 | 0.00 | 12.00 | 1.56396 | 60.90 | refracting surface |
| 2 | 0.00 | 12.00 | 33.59 | 6.57 | 1.56396 | 60.90 | reflecting surface |
| 3 | −6.05 | 9.45 | 20.42 | 7.00 | 1.56396 | 60.90 | reflecting surface |
| 4 | −9.16 | 15.73 | 6.14 | 7.00 | 1.56396 | 60.90 | reflecting surface |
| 5 | −13.53 | 10.26 | −13.12 | 7.00 | 1.56396 | 60.90 | reflecting surface |
| 6 | −19.87 | 13.23 | −32.41 | 4.83 | 1.56396 | 60.90 | reflecting surface |

-continued

| | | | | | | | |
|---|---|---|---|---|---|---|---|
| 7 | −19.87 | 8.40 | 0.03 | variable | 1 | | retracting surface |
| 8 | −19.87 | 7.20 | 0.03 | 4.49 | 1.56396 | 60.90 | refracting surface |
| 9 | −19.87 | 2.70 | 31.67 | 6.81 | 1.56396 | 60.90 | reflecting surface |
| 10 | −13.79 | 5.76 | 27.73 | 7.00 | 1.56396 | 60.90 | reflecting surface |
| 11 | −12.83 | −1.17 | 28.85 | 6.20 | 1.56396 | 60.90 | reflecting surface |
| 12 | −7.19 | 1.39 | 32.78 | 4.60 | 1.56396 | 60.90 | reflecting surface |
| 13 | −7.19 | −3.21 | 0.00 | variable | 1 | | refracting surface |
| 14 | −7.19 | −14.07 | 0.00 | 2.00 | 1 | | aperture stop |
| 15 | −7.19 | −16.07 | 0.00 | 4.61 | 1.56396 | 60.90 | refracting surface |
| 16 | −7.19 | −20.68 | −28.88 | 6.66 | 1.56396 | 60.90 | reflecting surface |
| 17 | −12.82 | −17.13 | −15.21 | 6.53 | 1.56396 | 60.90 | reflecting surface |
| 18 | −15.82 | −22.93 | 1.26 | 6.31 | 1.56396 | 60.90 | reflecting surface |
| 19 | −18.47 | −17.20 | 13.61 | 5.99 | 1.56396 | 60.90 | reflecting surface |
| 20 | −23.19 | −20.88 | 26.05 | 4.83 | 1.56396 | 60.90 | reflecting surface |
| 21 | −23.19 | −16.05 | 0.05 | variable | 1 | | refracting surface |
| 22 | −23.19 | −13.99 | 0.00 | 1.20 | 1.51633 | 0.00 | refracting plane |
| 23 | −23.19 | −12.79 | 0.00 | 1.00 | 1 | | retracting plane |
| 24 | −23.19 | −11.79 | −0.00 | | 1 | | imaging plane |

| | Wide side end | Middle | Tele side end |
|---|---|---|---|
| D7 | 1.20 | 6.62 | 9.79 |
| D13 | 10.86 | 5.98 | 2.00 |
| D21 | 2.06 | 2.59 | 1.79 |

D1 to 7 surface     $Z_i(M) = Z_i(W) - 0.00$     $Z_i(T) = Z_i(W) - 0.00$
D8 to 13 surface     $Z_i(M) = Z_i(W) - 5.42$     $Z_i(T) = Z_i(W) - 8.59$
D14 to 21 surface     $Z_i(M) = Z_i(W) - 0.53$     $Z_i(T) = Z_i(W) + 0.27$
D22 plane     $Z_i(M) = Z_i(W)$     $Z_i(T) = Z_i(W)$
Form of spherical surface R1 surface     $r1 = \infty$
R7 surface     $r7 = -9.493$
R8 surface     $r8 = 11.940$
R13 surface     $r13 = 7.716$
R15 surface     $r15 = 22.457$
R21 surface     $r21 = -59.582$
R22 plane     $r22 = \infty$
R23 plane     $r23 = \infty$
Form of aspherical surface

| | | | | |
|---|---|---|---|---|
| R2 surface | C02 = −2.64297e−02 | C20 = −4.16808e−02 | | |
| | C03 = 1.12952e−03 | C21 = 6.96239e−04 | | |
| | C04 = −4.07266e−05 | C22 = 1.25950e−04 | C40 = −1.65111e−04 | |
| | C05 = 3.58804e−05 | C23 = 9.87906e−06 | C41 = −1.00196e−05 | |
| | C06 = 8.34337e−06 | C24 = 1.73442e−06 | C42 = −1.34906e−06 | C60 = −1.07669e−06 |
| R3 surface | C02 = −1.47394e−02 | C20 = −7.78231e−02 | | |
| | C03 = 8.07121e−04 | C21 = 2.80537e−03 | | |
| | C04 = −2.70200e−04 | C22 = 8.23547e−04 | C40 = −2.48742e−03 | |
| | C05 = 7.70691e−05 | C23 = −3.79996e−04 | C41 = 1.70873e−04 | |
| | C06 = 1.41954e−05 | C24 = −4.95868e−05 | C42 = −1.13862e−04 | C60 = −8.92768e−05 |
| R4 surface | C02 = −3.30657e−02 | C20 = −4.80646e−02 | | |
| | C03 = 2.17506e−04 | C21 = 2.11138e−04 | | |
| | C04 = −1.22827e−04 | C22 = −2.22450e−04 | C40 = −2.10819e−04 | |
| | C05 = −4.53364e−06 | C23 = −9.98441e−09 | C41 = −7.61893e−06 | |
| | C06 = 8.51092e−07 | C24 = −2.13079e−06 | C42 = −2.69852e−06 | C60 = 9.29283e−07 |
| R5 surface | C02 = −3.43871e−02 | C20 = −8.88779e−02 | | |
| | C03 = 1.47443e−03 | C21 = −1.31114e−03 | | |
| | C04 = −2.84493e−04 | C22 = −1 43158e−03 | C40 = 2.86549e−04 | |
| | C05 = 3.40002e−05 | C23 = 1.38438e−04 | C41 = −8.93767e−06 | |
| | C06 = −1.21282e−05 | C24 = −6.25518e−05 | C42 = −1.00024e−04 | C60 = −7.01196e−05 |
| R6 surface | C02 = −3.16340e−02 | C20 = −4.32906e−02 | | |
| | C03 = 1.96355e−04 | C21 = −1.54584e−04 | | |
| | C04 = −3.59177e−05 | C22 = −1.09138e−04 | C40 = −5.08320e−05 | |
| | C05 = 5.16597e−07 | C23 = −6.53231e−07 | C41 = −6.21084e−06 | |
| | C06 = −3.52026e−07 | C24 = −7.80475e−07 | C42 = −6.83355e−07 | C60 = −3.55552e−07 |
| R9 surface | C02 = 7.56147e−03 | C20 = −1.10463e−03 | | |
| | C03 = −4.92383e−04 | C21 = 1.93110e−03 | | |
| | C04 = 3.53597e−05 | C22 = 1.75257e−04 | C40 = −3.42832e−05 | |
| | C05 = 7.85621e−06 | C23 = −3.88109e−05 | C41 = 5.46229e−05 | |
| | C06 = 7.29967e−07 | C24 = −5.48986e−06 | C42 = 2.67545e−06 | C60 = −1.38344e−05 |
| R10 surface | C02 = −1.67522e−02 | C20 = −3.639186e−02 | | |
| | C03 = −5.42586e−04 | C21 = 4.58276e−04 | | |
| | C04 = 4.58774e−08 | C22 = 7.81379e−05 | C40 = 8.14102e−06 | |
| | C05 = −8.58082e−06 | C23 = −5.58260e−06 | C41 = 1.91688e−05 | |
| | C06 = 4.00630e−06 | C24 = −5.16037e−07 | C42 = −2.51981e−06 | C60 = −2.40246e−06 |
| R11 surface | C02 = 7.12255e−04 | C20 = −1.3609Be−02 | | |
| | C03 = −1.31121e−03 | C21 = −8.16068e−04 | | |
| | C04 = 4.24545e−05 | C22 = 1.60954e−04 | C40 = −5.21475e−04 | |

-continued

|  | | | |  |
|---|---|---|---|---|
|  | C05 = −2.05367e−05 | C23 = −2.60757e−05 | C41 = 6.97505e−05 | |
|  | C06 = −2.94249e−06 | C24 = −2.32937e−05 | C42 = 1.18337e−05 | C60 = 6.29661e−05 |
| R12 surface | C02 = 1.45555e−02 | C20 = 1.56582e−02 | | |
|  | C03 = −1.06837e−03 | C21 = 1.81506e−04 | | |
|  | C04 = −1.97984e−04 | C22 = −4.77846e−04 | C40 = 1.09805e−04 | |
|  | C05 = 5.06557e−06 | C23 = 1.60145e−04 | C41 = 2.10897e−05 | |
|  | C06 = −2.45712e−05 | C24 = 2.89869e−07 | C42 = −2.84800e−05 | C60 = −2.78608e−05 |
| R16 surface | C02 = 3.42557e−02 | C20 = 1.92181e−02 | | |
|  | C03 = −4.92187e−04 | C21 = −1.63309e−03 | | |
|  | C04 = 6.40535e−05 | C22 = 7.82532e−05 | C40 = −2.60828e−05 | |
|  | C05 = −3.19695e−06 | C23 = −1.12087e−06 | C41 = −2.12347e−05 | |
|  | C06 = 8.71245e−08 | C24 = 1.12780e−06 | C42 = −1.67580e−08 | C60 = −3.08995e−07 |
| R17 surface | C02 = 1.10613e−02 | C20 = −2.79660e−03 | | |
|  | C03 = 1.95535e−03 | C21 = −3.03714e−03 | | |
|  | C04 = 3.57814e−05 | C22 = −2.76051e−04 | C40 = −5.00219e−05 | |
|  | C05 = −2.57776e−04 | C23 = −7.50174e−05 | C41 = 9.95534e−06 | |
|  | C06 = 2.71256e−05 | C24 = 5.34166e−05 | C42 = −3.74417e−06 | C60 = −1.14901e−06 |
| R18 surface | C02 = 5.58949e−02 | C20 = 4.52817e−02 | | |
|  | C03 = 1.73330e−03 | C21 = −8.30520e−03 | | |
|  | C04 = 1.16050e−04 | C22 = −6.42047e−04 | C40 = 9.41651e−05 | |
|  | C05 = −5.23975e−05 | C23 = −1.40593e−04 | C41 = −2.72454e−05 | |
|  | C06 = −9.55611e−06 | C24 = −3.07132e−06 | C42 = 1.08121e−05 | C60 = 3.36851e−06 |
| R19 surface | C02 = 8.19520e−03 | C20 = −1.24723e−01 | | |
|  | C03 = −3.99150e−03 | C21 = 1.95671e−02 | | |
|  | C04 = 6.07633e−04 | C22 = −3.42262e−03 | C40 = 2.86559e−03 | |
|  | C05 = −1.29357e−04 | C23 = 1.79231e−04 | C41 = 1.78820e−04 | |
|  | C06 = 2.22916e−06 | C24 = 4.35135e−06 | C42 = −1.92542e−04 | C60 = 8.10346e−04 |
| R20 surface | C02 = 1.86597e−02 | C20 = 4.38954e−02 | | |
|  | C03 = −2.04460e−03 | C21 = 5.13347e−05 | | |
|  | C04 = −1.60955e−04 | C22 = −2.53242e−04 | C40 = −1.08210e−04 | |
|  | C05 = −1.48692e−05 | C23 = 5.28089e−05 | C41 = −9.99386e−05 | |
|  | C06 = −4.46372e−06 | C24 = −3.94488e−08 | C42 = −8.54202e−06 | C60 = −2.49328e−07 |

Figure 3:
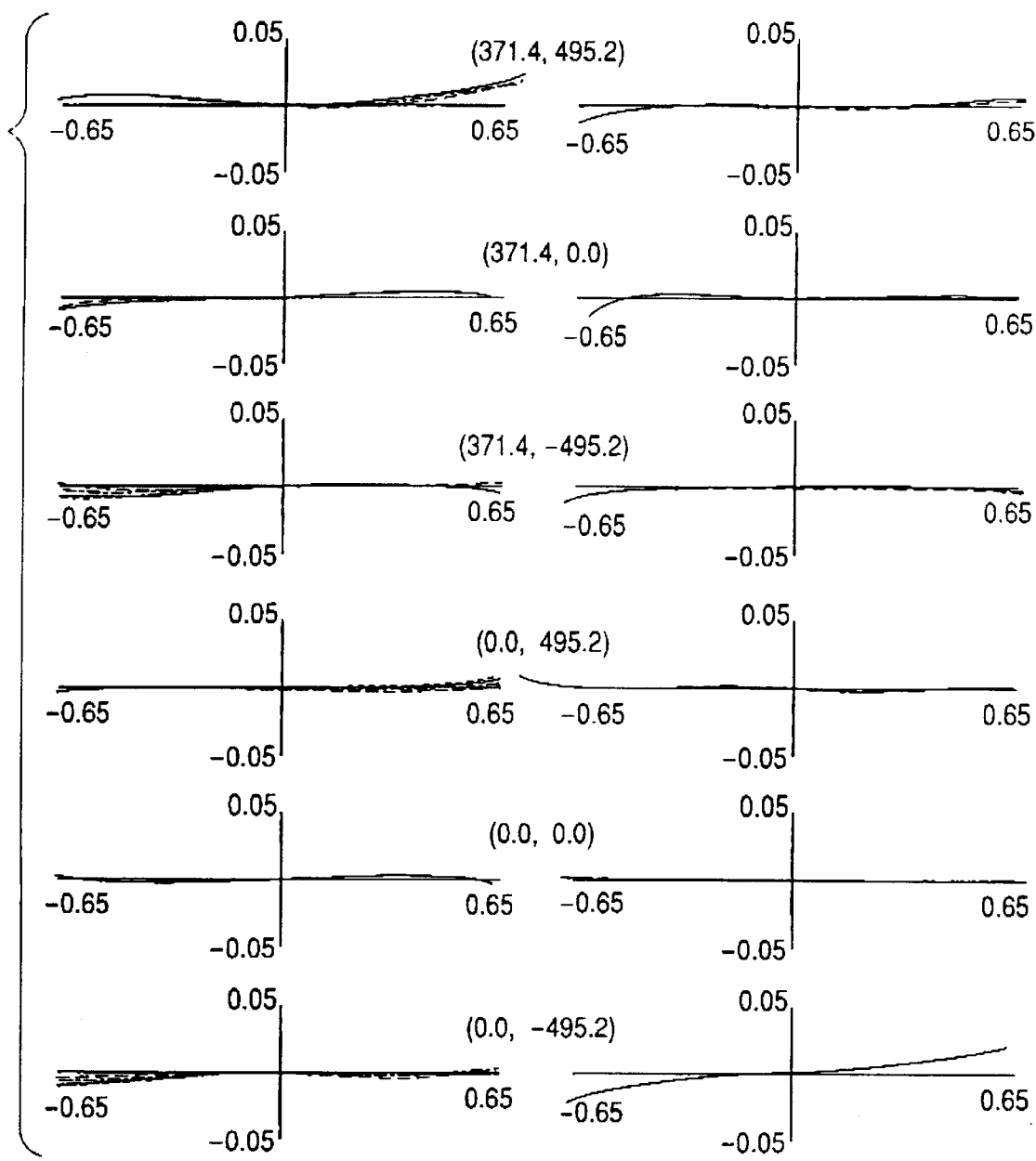
FIG. 3 shows the lateral aberration of the reflecting optical system according to the present embodiment at the wide angle end thereof.
Figure 4:
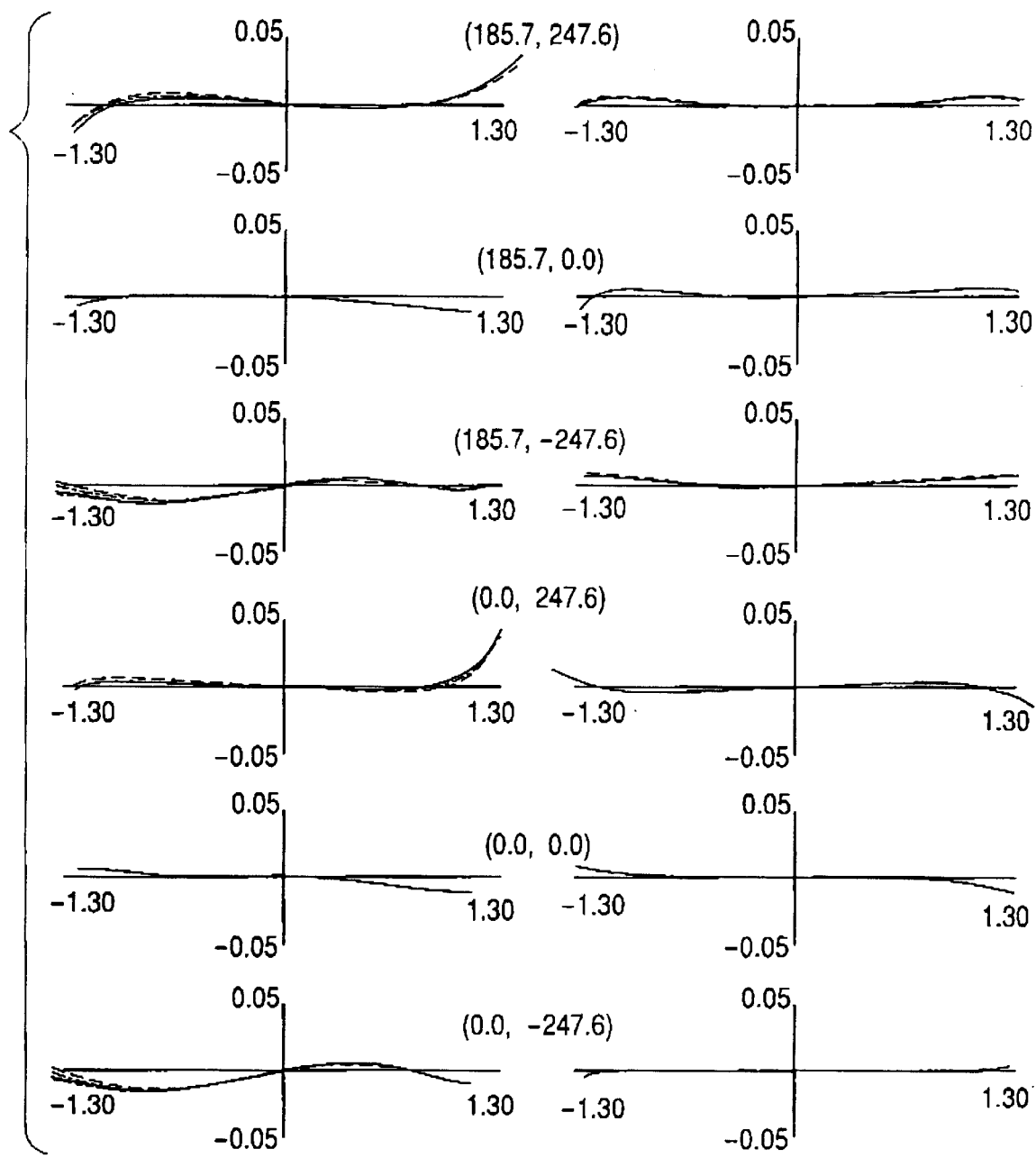
FIG. 4 shows the lateral aberration of the reflecting optical system according to the present embodiment at the middle position thereof.
Figure 5:
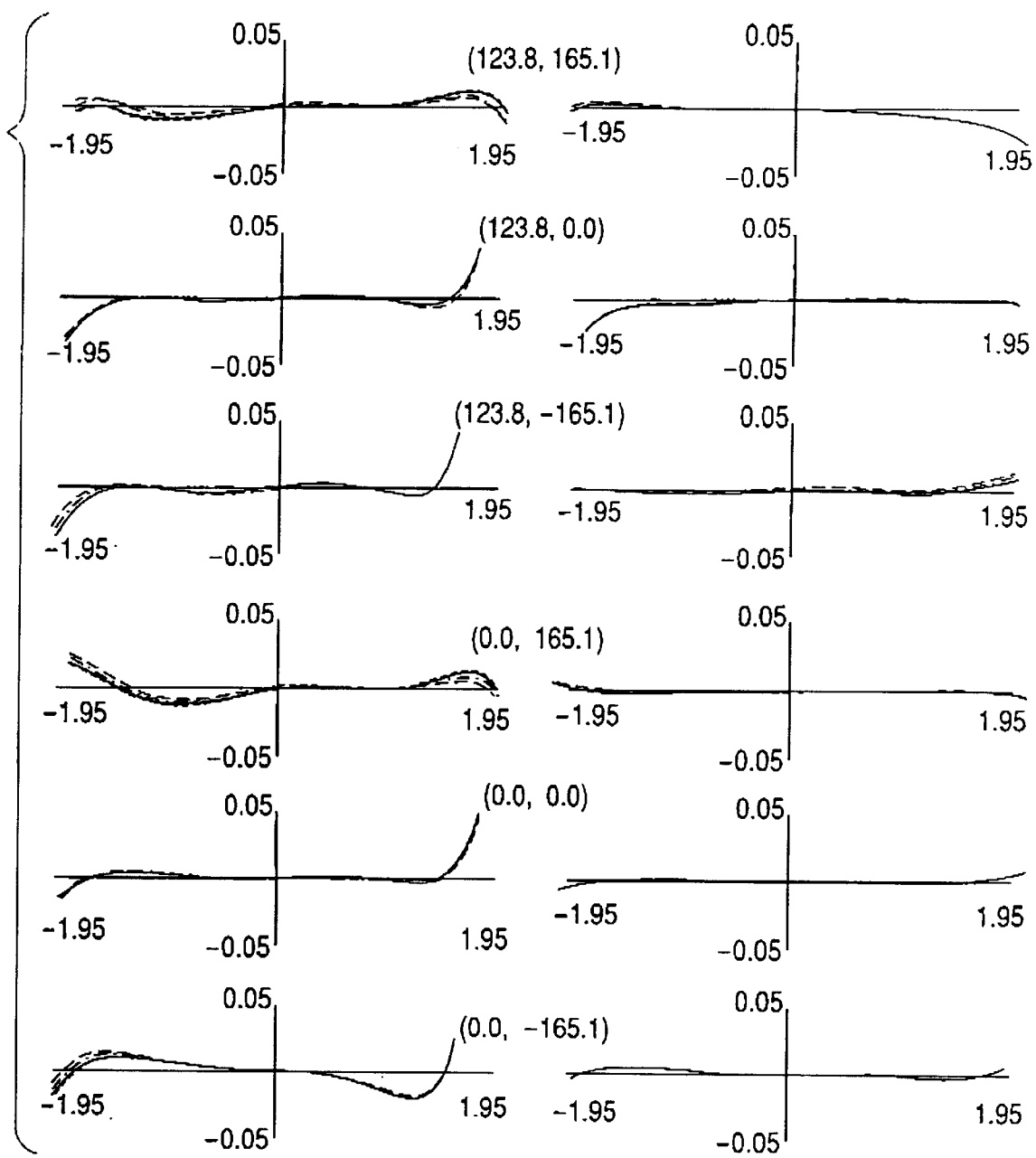
FIG. 5 shows the lateral aberration of the reflecting optical system according to the present embodiment at the telephoto end thereof.
Figure 6:
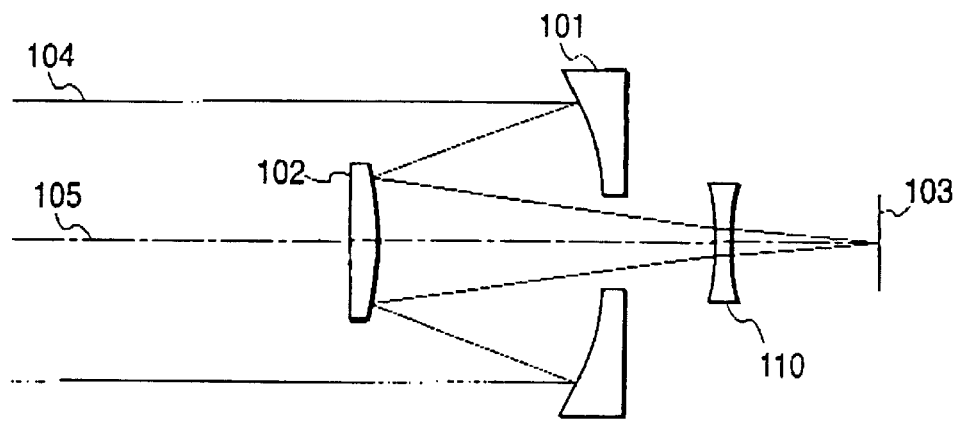
FIG. 6 is a cross-sectional view of a Cassegrainian reflector capable of zooming according to the prior art.
Figure 7:
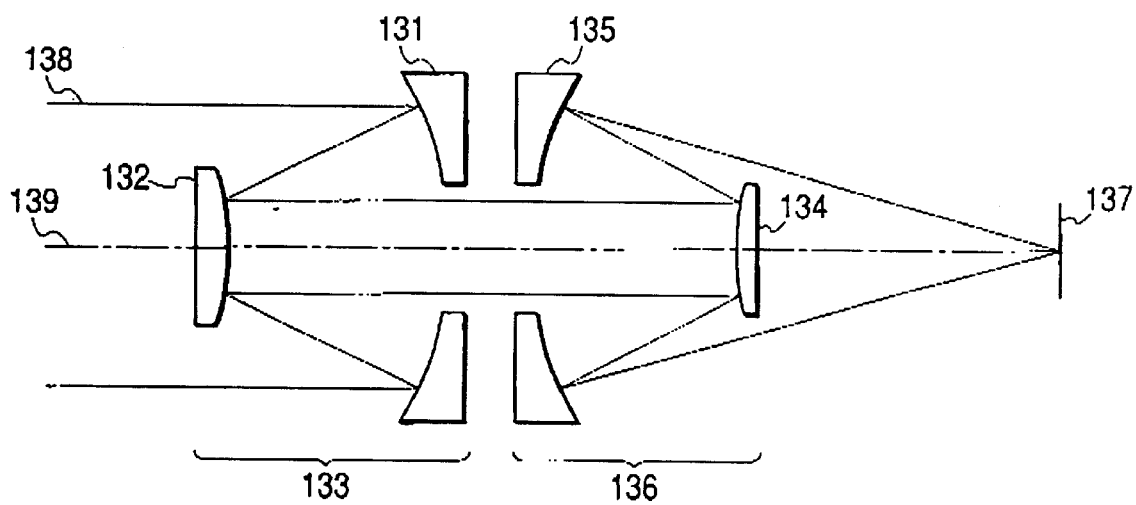
FIG. 7 is a cross-sectional view of a zoom optical system provided with reflecting mirrors according to the prior art.
Figure 8:
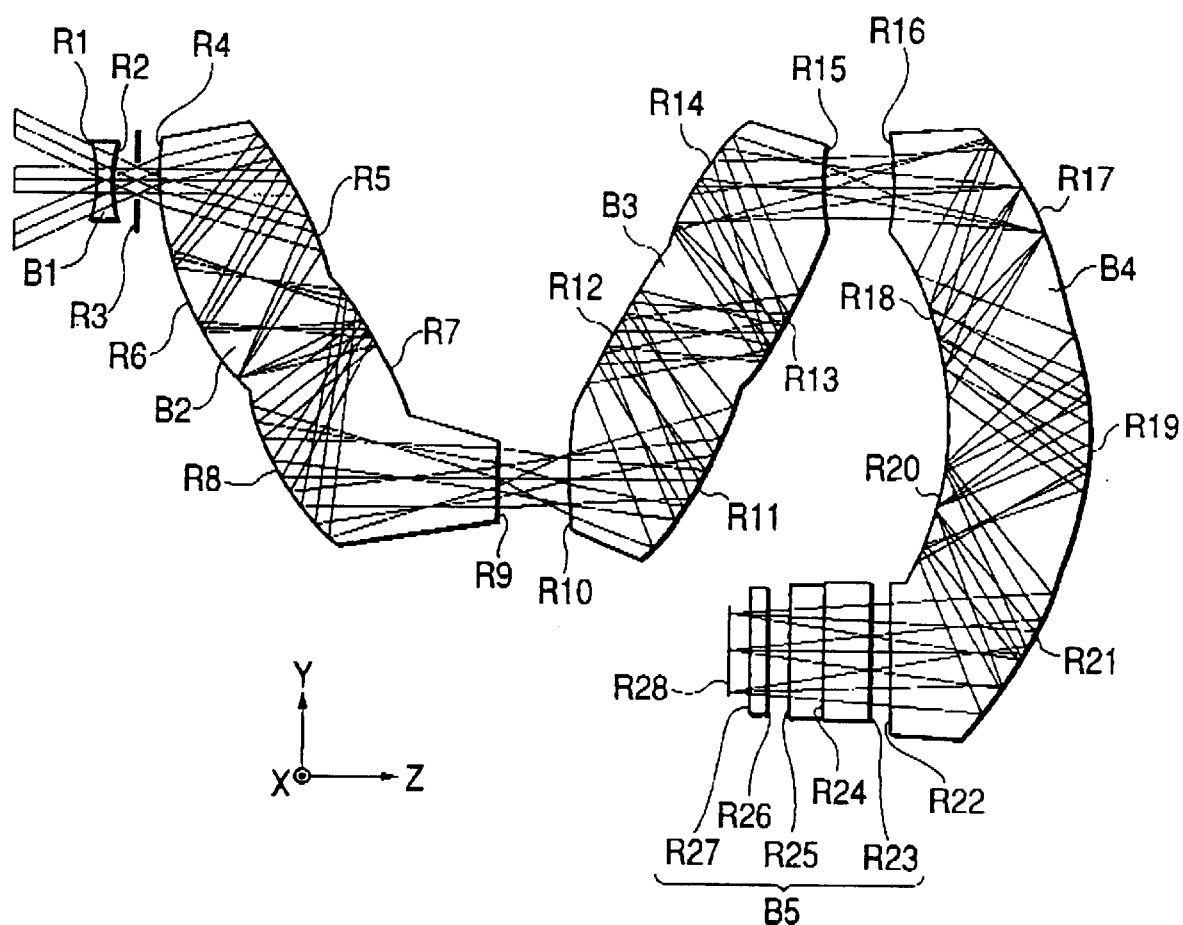
FIG. 8 is a cross-sectional view of a zoom optical system provided with reflecting optical elements according to the prior art.

FIGS. 3 to 5 show the lateral aberrations of the reflecting optical system according to the numerical value embodiments of the present embodiment, and more particularly show the lateral aberrations at the wide angle end (W), the middle position (M) and the telephoto end (T), respectively. Specifically, they show the lateral aberrations of beams of angles of incidence in which the vertical angle of incidence and the horizontal angle of incidence onto the first surface R1 are (0, −uY), (0, 0), (0, uY), (uX, −uY), (uX, 0) and (uX, uY), respectively. In the graphs of the lateral aberrations, the axis of abscissas represents the incidence height onto the pupil, and the axis of ordinates represents the amount of aberration. In any of the embodiments, basically each surface is of a plane-symmetrical shape in which only the yz plane is a symmetrical plane and therefore, in the graphs of the lateral aberrations, the plus and minus directions of the vertical angle of field are the same and therefore, for the simplification of showing, the lateral magnification in the minus direction is omitted.

In the present embodiment, the entrance pupil which is the image of the stop is made near the incidence surface of the first optical element B1, and the beam is condensed by using a reflecting surface in the first optical element B1, whereby the first optical element B1 which is the objective system is made into a system having a wide angle of field and yet being thin. Also, an intermediate image is formed to thereby relay the image. With such a construction, the thickness of the first optical element B1 as well as the second optical element B2 and the third optical element B3 subsequent to the intermediate image is prevented from becoming great. The thickness of the optical system referred to herein is a direction perpendicular to the plane of the drawing sheet of FIG. 1 or FIGS. 2A to 2C, and the word "thin" is used in the sense that this thickness is small.

The variable power optical system of the present embodiment has an eccentric reflecting surface and therefore various eccentric aberrations occur. To correct these eccentric aberrations in the entire variable power area, it is necessary to correct them in each optical element or cancel them among the optical elements. The third optical element B3 in the present embodiment has its object point moved in case of magnification change, but irrespective of the movement of the object point, it is generally difficult to correct an eccentric aberration in an optical element.

Consequently, the variable power optical system according to the present embodiment is a variable power optical system in which the third optical element B3 is provided with a curved reflecting surface having an asymmetrical cross-sectional shape in a plane containing the reference axis and inclined with respect to the reference axis, whereby the eccentric aberrations are corrected to the utmost in the optical element relative to a particular object point, and the fluctuation of the eccentric aberrations is cancelled among the optical elements, whereby the eccentric aberrations are corrected over the entire variable power area.

Also, the incidence reference axis and emergence reference axis of the second optical element B2 which is a variator are made the same in direction, whereby the amount of movement of the imaging plane during magnification change and the amount of movement of the third optical element B3 which is a compensator for correcting it can be made small.

The incidence reference axis and emergence reference axis of the third optical element B3 which is a compensator are made opposite in direction to each other, whereby the final imaging position can be brought to between the second optical element B2 and the third optical element B3, and this is advantageous for the downsizing of the entire optical system. Also, by the refractive power of the second optical element B2 which is a variator being made positive, the curvature of each surface constituting the second optical element B2 can be loosened. This is also effective for the error of manufacture. It is also advantageous for such a problem as the reflection of dust and bubbles into the intermediate imaging position occurring because the frequency of intermediate imaging which was four times in Japanese Patent Application Laid-Open No. 09-258105 was decreased to three times.

A stop is provided between an optical element and an optical element, whereby even if the diameter of the stop is fixed and the focal length is changed to 3.8 to 10.8 mm, F number is substantially constant at 2.8.

Also, at the wide angle end, the imaging magnification of the entrance pupil at the stop position is 0.28 times. When the stop is in front of the optical system, the size of the entrance pupil is directly the diameter of the stop, but in the present embodiment, the imaging magnification of the entrance pupil is thus set appropriately, whereby the diameter of the small stop is prevented from becoming extremely small.

Also, by adopting a construction in which the image of the stop is formed at a negative magnification by the optical system forward of the stop position, the effective diameter of the ray of light on each surface is restrained to a small level, and the compactness of each optical element and the entire photo-taking optical system is achieved.

As described above, in an optical system of the reflection type having at least one optical element designed such that two refracting surfaces and a plurality of reflecting surfaces are formed on the surface of a transparent body and a beam enters from a refracting surface into the interior of the transparent body and repeats reflection by the plurality of reflecting surfaces and emerges from another refracting surface, or at least one optical element designed such that a plurality of reflecting surfaces comprising a surface reflecting mirror are integrally formed and an incident beam repeats reflection by the plurality of reflecting surfaces and emerges, and including at least one coaxial refracting optical element comprised of one of the aforedescribed optical elements or only a refracting surface, in succession from the object side, a first optical element has negative optical power, a second optical element has positive optical power and a third optical element has negative optical power, and a stop is provided among these optical elements, whereby as compared with the case of a pre-stop, a reduction in the quantity of marginal light can be prevented and the diameter of the small stop can be prevented from becoming extremely small.

Also, in a zoom optical system of the reflection type in which the relative position of at least two of the plurality of optical elements is changed to thereby effect zooming, a stop is provided among the optical elements, whereby the F number can be made substantially constant even if the diameter of the stop is fixed during zooming.

What is claimed is:

1. An optical system comprising, in succession from the light entrance side:
    a first optical element of negative optical power;
    a second optical element of positive optical power; and
    a third optical element of negative optical power,
    wherein at least one of said first to third optical elements is a reflecting optical element having a plurality of reflecting curved surfaces,
    wherein said optical system further comprises an aperture stop disposed between two of said first to third optical elements, and
    wherein the image of said aperture stop by the optical element disposed more adjacent to the object side than said aperture stop is formed at a negative magnification.

2. The optical system of claim 1, wherein said reflecting optical element has two refracting surfaces and said plurality of reflecting curved surfaces, and light having entered from one of the refracting surfaces into said reflecting optical element is reflected by said plurality of reflecting curved surfaces, and thereafter emerges out of said reflecting optical element through the other refracting surface.

3. The optical system of claim 1, wherein the positions of at least two of said first to third optical elements relative to the imaging plane are changed to thereby effect zooming.

4. The optical system of claim 3, wherein said at least two optical elements of which the positions relative to the imaging plane are changed are said second optical element and said third optical element.

5. The optical system of claim 4, wherein each of said second optical element and said third optical element is said reflecting optical element, said second optical element is such that the incidence reference axis and emergence reference axis thereof are parallel to each other and face in the same direction, and said third optical element is such that the incidence reference axis and emergence reference axis thereof are parallel to each other and face in opposite directions.

6. An optical apparatus comprising:
    the optical system of claim 1; and
    an image pickup element for receiving an image formed by said optical system.

7. An optical system comprising, in succession from the light entrance side:
    a first optical unit of negative optical power;
    a second optical unit of positive optical power; and
    a third optical unit of negative optical power,
    wherein the positions of at least two of said first to third optical units relative to the imaging plane are changed to change distances between said first to third optical units and thereby effect zooming, and
    wherein at least one of said first to third optical units has a reflecting optical element having a plurality of reflecting curved surfaces.

8. The optical system of claim 7, wherein said reflecting optical element has two refracting surfaces and said plurality of reflecting curved surfaces, and light having entered from one of the refracting surfaces into said reflecting optical element is reflected by said plurality of reflecting curved surfaces, and thereafter emerges out of said reflecting optical element through the other refracting surface.

9. The optical system of claim 7, further comprising:
    an aperture stop disposed between two of said first to third optical units,
    wherein the image of said aperture stop by the optical unit disposed more adjacent to the object side than said aperture stop is formed at a negative magnification.

10. The optical system of claim 7, wherein said at least two optical units of which the positions relative to the imaging plane are changed are said second optical unit and said third optical unit.

11. The optical system of claim 10, wherein each of said second optical unit and said third optical unit has said reflecting optical element, said second optical unit is such that the incidence reference axis and emergence reference axis thereof are parallel to each other and face in the same direction, and said third optical unit is such that the incidence reference axis and emergence reference axis thereof are parallel to each other and face in opposite directions.

12. An optical apparatus comprising:
    the optical system of claim 7; and
    an image pickup element for receiving an image formed by said optical system.

* * * * *

UNITED STATES PATENT AND TRADEMARK OFFICE
CERTIFICATE OF CORRECTION

PATENT NO. : 6,633,431 B2
DATED : October 14, 2003
INVENTOR(S) : Takeshi Akiyama It is certified that error appears in the above-identified patent and that said Letters Patent is hereby corrected as shown below:

Column 8,
Line 19, "α1 + 1" should read -- αi + 1 --.

Column 11,
Line 2, "retracting" should read -- refracting --.
Line 38, "C22 = 1.25950e-04" should read -- C22 = -1.25950e-04 --.
Line 41, "C04 = -2.70200e-04" should read -- C04 = 2.70200e-04 --.
Line 42, "C05 = 7.70691e-05" should read -- C05 = -7.70691e-05 --.
Line 43, "C06 = 1.41954e-05" should read -- C06 = -1.41954e-05 --.
Line 48, "C06 = 8.51092e-07" should read -- C06 = 6.51092e-07 --.
Line 49, "C02 = -3.43871e-02" should read -- C02 = -3.43671e-02 --.
Line 50, "C22 = -1 43158e-03" should read -- C22 = -1.43158e-03 --.
Line 55, "C41 = -6.21084e-06" should read -- C41 = -6.21064e-06 --.
Line 56, "C24 = -7.80475e-07 C42 = -6.83355e-07" should read -- C24 = -7.90475e-07 C42 = -6.83955e-07 --.
Line 60, "C20 = -3.639186-02" should read -- C20 = -3.63916e-02 --.
Line 62, "C04 = 4.58774e-08" should read -- C04 = 4.58774e-06 --.
Line 65, "C20 = -1.3609Be-02" should read -- C20 = -1.36098e-02 --.

UNITED STATES PATENT AND TRADEMARK OFFICE
CERTIFICATE OF CORRECTION

PATENT NO. : 6,633,431 B2
DATED : October 14, 2003
INVENTOR(S) : Takeshi Akiyama It is certified that error appears in the above-identified patent and that said Letters Patent is hereby corrected as shown below:

<u>Column 13,</u>
Line 3, "C05 = -2.05367e-05" should read -- C05 = -2.08367e-05 --.
Line 6, "C22 = -4.77846e-04" should read -- C22 = -4.77849e-04 --.
Line 8, "C42 = -2.84800e-05" should read -- C42 = -2.84600e-05 --.
Line 12, "C42 = -1.67580e-08" should read -- C42 = -1.67580e-06 --.
Line 15, "C05 = -2.57776e-04" should read -- C05 = -2.87776e-04 -- and "C41 = 9.95534e-06" should read -- C41 = 9.96534e-06 --.
Line 16, "C06 = 2.71256e-05" should read -- C06 = 2.71258e-05 --.
Line 28, "C24 = -3.94488e-08" should read -- C24 = -3.94488e-06 -- and "C42 = -8.54202e-06" should read -- C42 = -6.54202e-06 --.

Signed and Sealed this

Thirtieth Day of March, 2004

JON W. DUDAS
*Acting Director of the United States Patent and Trademark Office*